US012790515B2

(12) United States Patent
Mahoney et al.

(10) Patent No.: US 12,790,515 B2
(45) Date of Patent: Nov. 10, 2026

(54) FREE-RADICALLY POLYMERIZABLE CROSSLINKER, CURABLE COMPOSITION, AND ADHESIVE THEREFROM

(71) Applicant: 3M INNOVATIVE PROPERTIES COMPANY, St. Paul, MN (US)

(72) Inventors: Wayne S. Mahoney, St. Paul, MN (US); Michael A. Kropp, Cottage Grove, MN (US); Anthony J. Ostlund, Forest Lake, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 730 days.

(21) Appl. No.: 18/036,227

(22) PCT Filed: Sep. 29, 2021

(86) PCT No.: PCT/IB2021/058969
§ 371 (c)(1),
(2) Date: May 10, 2023

(87) PCT Pub. No.: WO2022/101701
PCT Pub. Date: May 19, 2022

(65) Prior Publication Data

US 2024/0076523 A1 Mar. 7, 2024

Related U.S. Application Data

(60) Provisional application No. 63/112,875, filed on Nov. 12, 2020.

(51) Int. Cl.

| | |
|---|---|
| ***C08J 11/08*** | (2006.01) |
| ***C08G 65/332*** | (2006.01) |
| ***C09J 4/06*** | (2006.01) |
| ***C09J 11/08*** | (2006.01) |
| ***C09J 151/08*** | (2006.01) |

(52) U.S. Cl.
CPC ............ *C09J 4/06* (2013.01); *C08G 65/3322* (2013.01); *C09J 11/08* (2013.01); *C09J 151/08* (2013.01)

(58) Field of Classification Search
CPC ............ C09J 4/06; C09J 11/08; C09J 151/08; C08G 65/332
USPC ........................................................ 523/201
See application file for complete search history.

(56) References Cited

U.S. PATENT DOCUMENTS 3,347,954 A 10/1967 Hellmut et al.
3,436,359 A 4/1969 Hubin et al.
8,545,225 B2 10/2013 Takei et al.
8,859,683 B2 10/2014 Takahashi et al.
9,957,408 B2 5/2018 Thompson
11,739,172 B2 * 8/2023 Rotto ................ C08F 220/1811 524/176
2012/0289995 A1 11/2012 Constant et al.
2016/0185712 A1 6/2016 Casasanta, III et al.
2023/0399463 A1 * 12/2023 Mahoney .............. C08F 220/30
2024/0059940 A1 * 2/2024 Rotto .................. B32B 37/1284

(Continued)

FOREIGN PATENT DOCUMENTS

DE 4025776 A1 2/1992
DE 4219700 A1 12/1992
EP 0059451 B1 7/1985

(Continued)

OTHER PUBLICATIONS

"Standard Practice for Use of Liquid Exclusion Chromatography Terms and Relationships", ASTM D3016-97, 2018, 5 pages.
Inan, "Preparation of Novel UV-Curable Methacrylated Urethane Resins from a Modified Epoxy Resin and Iisocyanatoethylmethacrylate (IEM)", 2002, Polymer Bulletin, vol. 47, pp. 437-444.
International Search Report for PCT International Application No. PCT/IB2021/058969, mailed on Dec. 12, 2021, 5 pages.
Klee, "Monomers for low shrinking composites, 2a Synthesis of branched methacrylates and their application in dental composites", Macromolecular chemistry and physics, 1999, vol. 200, No. 3, pp. 517-523.

(Continued)

*Primary Examiner* — Deve V Hall
(74) *Attorney, Agent, or Firm* — Ann Benjamin

(57) ABSTRACT

A free-radically polymerizable crosslinker comprising divalent segments Z represented by the formula (I). Each divalent segment Z is respectively directly bonded to i) two secondary N atoms, each further directly bonded to a divalent segment Z or an X group; ii) two tertiary N atoms, each further directly bonded to p additional divalent segments Z and (2-p) X groups, wherein p is 0, 1, or 2; or iii) a secondary N atom further directly bonded to one additional divalent segment Z or an X group, and a tertiary N atom further directly bonded to p additional divalent segments Z and (2-p) X groups. $R^1$ represents an alkylene group having from 1 to 4 carbon atoms, n represents a positive integer. X is represented by the formula: (II) L represents a covalent bond, O, S, $NR^1$, or a divalent linking group having from 2 to 8 carbon atoms and up to 3 oxygen atoms. $R^2$ is a free-radically polymerizable group selected from vinyloxy, allyloxy, methacryloxy, vinylaryl having from 8 to 12 carbon atoms, and 2-propenylaryl having from 9 to 13 carbon atoms. No two of O, S, or N atoms in the X group are adjacent. A curable composition comprises a monofunctional free-radically polymerizable monomer, a free-radical initiator, and the free-radically polymerizable crosslinker. At least partially cured reaction products are also disclosed.

$$-\!\!\left[\left(R^1-O\right)_n R^1\right]\!\!- \quad (I)$$

(II)

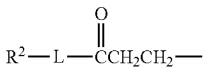

19 Claims, No Drawings

(56) References Cited

U.S. PATENT DOCUMENTS

| | | | | |
|---|---|---|---|---|
| 2024/0084060 | A1* | 3/2024 | Rotto | C08F 220/20 |
| 2024/0343951 | A1* | 10/2024 | Rotto | B32B 15/043 |

FOREIGN PATENT DOCUMENTS

| | | | |
|---|---|---|---|
| EP | 0670341 | B1 | 9/1999 |
| WO | 2020250154 | A1 | 12/2020 |
| WO | 2022034521 | A1 | 2/2022 |

OTHER PUBLICATIONS

Sarac, “Redox Polymerization”, Progress in Polymer Science, 1999, vol. 24, pp. 1149-1204.

Technical Information: “Dyneon™—Polyetherdiamine HC 1101”, 3M, 2001, 4 pages.

Yilmaz, “Effects of Nonreactive Resins on the Properties of a UV-Curable Methacrylated Urethane Resin”, 1998, Journal of Applied Polymer Science, vol. 69, pp. 1837-1845.

* cited by examiner

FREE-RADICALLY POLYMERIZABLE CROSSLINKER, CURABLE COMPOSITION, AND ADHESIVE THEREFROM

CROSS REFERENCE TO RELATED APPLICATIONS

This application is a national stage filing under 35 U.S.C. § 371 of PCT/IB2021/058944, filed Sep. 29, 2021, which claims the benefit of Provisional Application No. 63/112,875, filed Nov. 12, 2020, the disclosure of which is incorporated by reference in its/their entirety herein.

TECHNICAL FIELD

The present disclosure broadly relates to free-radically polymerizable crosslinkers, curable compositions, and adhesives.

BACKGROUND

Adhesives are known to be useful for bonding one substrate to another, e.g., a metal to a metal, a metal to a plastic, a plastic to a plastic, a glass to a glass. Structural adhesives are attractive alternatives to mechanical joining methods, such as riveting or spot welding, because structural adhesives distribute load stresses over larger areas rather than concentrating such stresses at a few points. Structural adhesives may also produce cleaner and quieter products because they can dampen vibration and reduce noise. Additionally, structural adhesives can be used to bond a variety of materials, sometimes without extensive surface preparation.

SUMMARY

In one aspect the present disclosure provides a free-radically polymerizable crosslinker comprising divalent segments Z represented by the formula $$-\!\!\left[(R^1-O)_n R^1\right]\!\!-$$

wherein each divalent segment Z is respectively directly bonded to:

i) two secondary N atoms, each further directly bonded to a divalent segment Z or an X group;

ii) two tertiary N atoms, each further directly bonded to p additional divalent segments Z and (2-p) X groups, wherein p is 0, 1, or 2; or iii) a secondary N atom further directly bonded to: one additional divalent segment Z or an X group, and a tertiary N atom further directly bonded to p additional divalent segments Z and (2-p) X groups, wherein each le independently represents an alkylene group having from 1 to 4 carbon atoms, wherein each n independently represents a positive integer, and wherein each X group is represented by the formula:

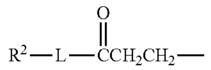

wherein each L independently represents a covalent bond, O, S, $NR^1$, or a divalent linking group having from 2 to 8 carbon atoms and up to 3 oxygen atoms, and wherein each $R^2$ is independently a free-radically polymerizable group selected from vinyloxy, allyloxy, methacryloxy, vinylaryl having from 8 to 12 carbon atoms, and 2-propenylaryl having from 9 to 13 carbon atoms, with the proviso that no two of O, S, or N atoms in the X group are adjacent.

In another aspect, the present disclosure provides a curable composition comprising:

at least one monofunctional free-radically polymerizable monomer;

at least one free-radical initiator; and at least one free-radically polymerizable crosslinker according to the present disclosure.

In another aspect, the present disclosure provides an at least partially cured reaction product of a curable composition according to the present disclosure.

As used herein:

the term "directly bonded to" means bonded to through a single covalent bond;

the term "free-radically polymerizable" means free-radically homopolymerizable and/or free-radically copolymerizable (i.e., with a different monomer/oligomer);

the term "(meth)acryl" refers to acryl (also referred to in the art as acryloyl and acrylyl) and/or methacryl (also referred to in the art as methacryloyl and methacrylyl);

the terms "methylvinyl", "propen-2-yl", and their equivalents do not include $CH_2{=}C(CH_3)$— groups within acryl groups;

the term "secondary nitrogen" refers to a neutral N atom covalently bonded to H and two carbon atoms;

the term "tertiary nitrogen" refers to a neutral N atom covalently bonded to three carbon atoms; and the term "vinyl" and its equivalents do not include CH2=CH— groups within acryl groups; and Features and advantages of the present disclosure will be further understood upon consideration of the detailed description as well as the appended claims

DETAILED DESCRIPTION

Though known structural adhesives may have good high-temperature performance and durability, the rigid bond these structural adhesives create after curing can lead to poor impact resistance of the bonded parts and subsequent bond failure. Additionally, adhesives having rigid bonds have high and uneven stresses distributed throughout the bond, with the stress at the edges of the bond typically higher than the stress in the middle of the bond. The high stress of rigid structural adhesives can lead to the undesirable distortion of bonded materials, i.e., bond-line read through, which can be visually observed particularly when bonding larger parts, such as, for example, automotive panels.

One approach used in the industry to enhance flexibility and toughness of structural adhesives is the incorporation of elastomeric materials that can be dissolved or dispersed in the adhesive composition. Examples of such elastomeric materials may include, for example, a methyl methacrylate-butadiene-styrene copolymer ("MBS"), an acrylonitrile-styrene-butadiene copolymer, a linear polyurethane, an acrylonitrile-butadiene rubber, a styrene-butadiene rubber, a chloroprene rubber, a butadiene rubber, and natural rubbers. These elastomeric material additives can, however, lead to high viscosity of the liquid adhesive compositions that may result in handling challenges during use. Additionally, in the case of butadiene or other conjugated diene rubbers the elastomeric material additives may reduce the resistance to oxidation of the structural adhesive that may lead to bond failure.

The present disclosure provides curable compositions that are substantially free of liquid rubber materials, and yet yield bonded constructions displaying high adhesion (i.e., >1000 psi (>6.9 MPa) in a typical overlap shear test), elongation (i.e., values greater than 50%, greater than 100%, or greater than 400%), and impact resistance (i.e., >2 J) even if the bonded substrate (e.g., glass, ink-coated glass, metal, polymer) receives no surface treatment (e.g., corona, flame, abrasion) prior to bonding, due to the inclusion of novel crosslinkers described below. Curable compositions in embodiments of the present disclosure may further have the advantages of yielding bonded constructions displaying little to no bond-line read through, providing adhesive compositions exhibiting stretch release or release at slightly elevated temperature (e.g., less than 70° C.), which may enable rework of parts bonded with these adhesives, and providing sealants that resist hydrolysis upon heat/humidity aging.

Free-radically polymerizable crosslinkers according to the present disclosure can be made by exhaustive Michael addition of primary amine groups on a polyamine precursor compound with a reactant compound having an acryl group (e.g., in an acryloxy, acrylamido, or N-alkylacrylamido group) and also a free-radically polymerizable group that is less reactive with primary amines than the acryl group. Examples of such free-radically polymerizable groups include vinyloxy groups (i.e., $CH_2{=}CHO—$), allyloxy groups (i.e., $CH_2{=}CHCH_2O—$), vinylaryl groups wherein the aryl group has from 6 to 10 carbon atoms (e.g., vinylphenyl); methacryloxy, methacrylamido, N-alkylmethacrylamido groups, and 2-propenylaryl groups wherein the aryl group has from 6 to 10 carbon atoms (e.g., (2-propenyl) phenyl).

Suitable polyamine precursors can comprise divalent segments Z represented by the formula $$-\!\!\left[\!\left(R^1-O\right)_{n} R^1\right]\!\!-$$

wherein each divalent segment Z is respectively directly bonded to two N atoms, each independently further directly bonded to p additional divalent segments Z and (2-p) H atoms, wherein p is 1, or 2.

Each $R^1$ independently represents an alkylene group having from 1 to 4 carbon atoms. Examples include methylene (i.e., $—CH_2—$), ethylene (i.e., $—CH_2CH_2—$), propane-2-diyl, propane-1,3-diyl, butane-1,2-diyl, butane-1,3-diyl, and butane-1,4-diyl). Preferably, $R^1$ is butane-1,4-diyl (i.e., $—CH_2CH_2CH_2CH_2—$).

Each n independently represents a positive integer; for example, 1, 2, 3, 4, 5, 6, 7, 8, 9, 10, or more. In preferred embodiments, n is 1 to 5.

Each X group is represented by the formula:

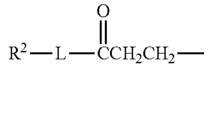

Each L independently represents a covalent bond, O, S, $NR^1$, or a divalent linking group having from 2 to 8 carbon atoms and up to 3 oxygen atoms, wherein each $R^1$ independently represents an alkylene group having from 1 to 4 carbon atoms. Examples of L include ethyleneoxy, bis(ethyleneoxy), tris(ethyleneoxy), methylene, ethylene, propan-1,3-diyl, butylen-1,4-diyl, hexylen-1,6-diyl, and octan-1,8-diyl.

Each $R^2$ is independently a free-radically polymerizable group selected from vinyloxy, methacryloxy, allyloxy, vinylaryl having from 8 to 12 carbon atoms (e.g., 4-vinylphenyl, 3-vinylphenyl, and 2-vinylphenyl), and 2-propenylaryl having from 9 to 13 carbon atoms (e.g., 4-(2'-propenyl)phenyl, 3-(2'-propenyl)phenyl, and 2-(2'-propenyl)phenyl).

L and $R^2$ are chosen such that no two of O, S, or N atoms in the X group are adjacent (i.e., no O—O, O—S, O—N, N—N, N—S, S—S, N═O, or S═O bonds).

Suitable polyamine precursors can be obtained from 3M Company, St. Paul, Minnesota, as DYNAMAR HC-1101 or prepared, for example, as described in U.S. Pat. No. 3,436,359 (Hubin et al.), the disclosure of which is incorporated herein by reference.

Suitable reactant compounds can be represented by the formula

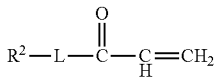

As discussed above, each L independently represents a covalent bond, O, S, $NR^1$, or a divalent linking group having from 2 to 8 carbon atoms and up to 3 oxygen atoms, wherein each $R^1$ independently represents an alkylene group having from 1 to 4 carbon atoms. Examples of L include ethyleneoxy, bis(ethyleneoxy), tris(ethyleneoxy), methylene, ethylene, propan-1,3-diyl, butylen-1,4-diyl, hexylen-1,6-diyl, and octan-1,8-diyl.

Each $R^2$ is independently a free-radically polymerizable group selected from vinyloxy, methacryloxy, allyloxy, vinylaryl having from 8 to 12 carbon atoms (e.g., 4-vinylphenyl, 3-vinylphenyl, and 2-vinylphenyl), and 2-propenylaryl having from 9 to 13 carbon atoms (e.g., 4-(2'-propenyl)phenyl, 3-(2'-propenyl)phenyl, and 2-(2'-propenyl)phenyl).

L and $R^2$ are chosen such that no two of O, S, or N atoms in the X group are adjacent (i.e., no O—O, O—S, O—N, N—N, N—S, S—S, N═O, or S═O bonds).

Exemplary suitable reactive compounds can include: acrylate/methacrylate monomers such as, for example, 1-(acryloyloxy)-3-(methacryloyloxy)-2-propanol available from TCI Americas, Portland, Oregon, and polyester acrylate/methacrylate monomers available as PEAM-1044, PEAM-1769 from Designer Molecules, Inc., San Diego, California; vinyl ether/acrylate monomers such as, for example, 2-(2-vinylethoxy)ethyl acrylate, 2-(2-vinylethoxy)-2-propyl acrylate, 2-(2-vinylethoxy)-3-propyl acrylate, 2-(2-vinylethoxy)-2-butyl acrylate, 2-(2-vinylethoxy)-4-butyl acrylate, 2-(2-allylethoxy)ethyl acrylate, 2-(2-allylethoxy)-2-propyl acrylate, 2-(2-allylethoxy)-3-propyl acrylate, 2-(2-allylethoxy)-2-butyl acrylate, 2-(2-allylethoxy)-4-butyl acrylate, 2-(2-vinylpropoxy)ethyl acrylate, 2-(2-vinylpropoxy)-2-propyl acrylate, 2-(2-vinylpropoxy)-3-propyl acrylate, 2-(3-vinylpropoxy) ethyl acrylate, 2-(3-vinylpropoxy)-2-propyl acrylate, 2-(3-vinylpropoxy)-3-propyl acrylate, 2-(vinyloxy)ethyl acrylate, and (2-(2-vinyloxyethoxy)ethyl acrylate (VEEA) available from Nippon Shokubai Co. Ltd., Osaka, Japan; allyl acrylates such as, for example, allyl acrylate, allyloxyethyl acrylate, allyloxyethoxyethyl acrylate, and allyloxypropyl acrylate; allyl acrylamides such as, for example, N-allylacrylamide and N-allyl-N-methylacrylamide; and styrene acrylates such as, for example, 4-acryloyloxyethylstyrene, 4-acryloyloxyethoxyethylstyrene, 4-acryloyloxypropylstyrene, 4-acryloyloxybutylstyrene, 4-acryloyloxyethoxystyrene, 4-acryloyloxyethoxyethoxystyrene, 4-acryloyloxypropoxystyrene, 4-acryloyloxybutoxystyrene; α-methylstyrene acrylates such as, for example, 2-(4'-acryloyloxyethylphenyl)propene, 2-(4'-acryloyloxyethoxyethyl)phenylpropene, 2-(4'-acryloyloxypropylphenyl)propene, 2-(4'-acryloyloxybutyl)phenylpropene, 2-(4'-acryloyloxyethoxyphenyl)propene, 2-(4'-acryloyloxyethoxyethoxyphenyl)propene, 2-(4-acryloyloxypropoxyphenyl)propene, and 2-(4'-acryloyloxybutoxyphenyl)propene. These compounds may be obtained from commercial sources and/or be prepared according to known methods; for example, by reaction of a corresponding alcohol and acryloyl chloride, or transesterification of a corresponding alcohol and a lower alkyl acrylate.

The number of X groups (i.e., 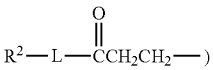 )

in the free-radically polymerizable crosslinker will depend on the number of amine groups (especially primary amine groups) in the polyamine. For example, the free-radically polymerizable crosslinker may have at least two, and at least 3, at least 4, at least five, or more than five X groups.

In some embodiments, the free-radically polymerizable crosslinker has a number average molecular weight of from 4000 to 54000 grams per mole as measured by gel permeation chromatography at 40° C. versus polystyrene standards in accordance with ASTM test method D3016-97 (2018). In particular, polymers can be analyzed by gel permeation chromatography (GPC) using Reliant GPC (Waters e2695 pump/autosampler) with Waters 2424 evaporative light scattering detector and PL-Gel-2 Columns; 300×7.5 mm each; one 3-micron Mixed-E (nominal MW range up to 30,000 Daltons) and one 5-micron Mixed-D (nominal MW range 200-400,000 Daltons). The free-radically polymerizable crosslinker is useful, for example, in curable compositions (e.g., curable structural adhesives). Curable compositions of the present disclosure include at least one free-radically polymerizable crosslinker as described hereinabove, at least one monofunctional free-radically polymerizable monomer, and at least one free-radical initiator. They may be prepared by simply combining the various ingredient using methods well-known to those of skill in the art.

Curable compositions of the present disclosure often include 2 to 60 percent by weight, or 5 to 50 percent by weight, of at least one free-radically polymerizable crosslinker according to the present disclosure; however, this is not a requirement.

Curable compositions according to the present disclosure also include at least one monofunctional free-radically polymerizable monomer. Examples include monofunctional (meth)acrylate monomers (e.g., 2-phenoxyethyl (meth)acrylate, cyclohexyl (meth)acrylate, benzyl (meth)acrylate, isobornyl (meth)acrylate), acid-functional monomers (e.g., (meth)acrylic acid), alkoxylated lauryl (meth)acrylate, alkoxylated phenol (meth)acrylate, alkoxylated tetrahydrofurfuryl (meth)acrylate, caprolactone (meth)acrylate, cyclic trimethylolpropane formal (meth)acrylate, ethylene glycol methyl ether (meth)acrylate, ethoxylated nonyl phenol (meth)acrylate, isodecyl (meth)acrylate, isooctyl (meth) acrylate, lauryl (meth)acrylate, octadecyl (meth)acrylate (stearyl (meth)acrylate), tetrahydrofurfuryl (meth)acrylate, tridecyl (meth)acrylate, tetrahydrofurfuryl (meth)acrylate, allyl (meth)acrylate, methyl (meth)acrylate, ethyl (meth) acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth) acrylate, n-dodecyl (meth)acrylate, 2-hydroxyethyl (meth) acrylate, 2- and 3-hydroxypropyl (meth)acrylate, 2-methoxyethyl (meth)acrylate, 2-ethoxyethyl (meth)acrylate, 2- or 3-ethoxypropyl (meth)acrylate, 2-(2-ethoxyethoxy)ethyl acrylate, glycidyl (meth)acrylate, phosphonate-functional (meth)acrylate monomers (e.g., the SIPOMER PAM resins from Solvay Specialty Polymers USA, LLC or those from Miwon North America (Exton, Pennsylvania) as MIRAMER SC1400 and MIRAMER SC1400A), N-(2-(2-oxo-1-imidazolidinyl)ethyl)methacrylamide, and methacrylamidoethyl ethylene urea ("MAEEU") available from Solvay Specialty Polymers USA, LLC as SIPOMER WAM II), and combinations thereof.

Specific examples of mono(meth)acrylate monomers useful in embodiments of the present disclosure include isobornyl acrylate (available from Sartomer as SR506, or from Evonik Performance Materials GmbH as VISIOMER IBOA), isobornyl methacrylate (available from Sartomer as SR423A or from Evonik Performance Materials GmbH under the trade name VISIOMER IBOMA), 2-phenoxyethyl methacrylate (available from SARTOMER as SR340), cyclohexyl methacrylate (available from Evonik Performance Materials GmbH as VISIOMER c-HMA), benzyl methacrylate (available from Miwon North America, Exton, Pennsylvania, as MIRAMER M1183), phenyl methacrylate (available from Miwon North America as MIRAMER M1041), allyl methacrylate (available from Evonik Performance Materials GmbH as VISIOMER AMA), 2-hydroxyethyl methacrylate (available from Evonik Performance Materials GmbH as VISIOMER HEMA 97 and HEMA 98), hydroxypropyl methacrylate (available from Evonik Performance Materials GmbH as VISIOMER HPMA 97 and HPMA 98), ultra-high purity 2-hydroxyethyl methacrylate (available from Evonik Performance Materials GmbH as VISIOMER UHP HEMA), methyl methacrylate (available from Evonik Performance Materials GmbH as VISIOMER MMA), methacrylic acid (available from Evonik Performance Materials GmbH as VISIOMER GMAA), n-butyl methacrylate (available from Evonik Performance Materials GmbH as VISIOMER n-BMA), isobutyl methacrylate (available from Evonik Performance Materials GmbH as VISIOMER i-BMA), glycerol formal methacrylate (available from Evonik Performance Materials GmbH as VISIOMER GLYFOMA), 2-(2-butoxyethoxy)ethyl methacrylate (available from Evonik Performance Materials GmbH as VISIOMER BDGMA), lauryl methacrylate (available from BASF, Florham Park, New Jersey, as LMA 1214 F, polypropylene glycol monomethacrylate (available from Miwon North America, Exton, Pennsylvania, as MIRAMER M1051), β-methacryloyl oxyethyl hydrogen succinate (available from Shin-Nakamura Co.

Ltd., Arimoto, Japan, as NK ES 1ER SA), 2-isocyanatoethyl methacrylate (available from Showa Denko K. K. (Tokyo, Japan) as KarenzMOl), 2-(methacryloyloxy)ethyl phthalate mono ((HEMA phthalate) available as product number X-821-2000 from ESSTECH, Inc., Essington, Pennsylvania), 2-(methacroyloxy)ethyl maleate (HEMA maleate available as product number X-846-0000 from ESSTECH, Inc.), methoxy diethylene glycol methacrylate (available from Shin-Nakamura Co. Ltd. as M-20G, methoxy triethylene glycol methacrylate (available from Shin-Nakamura Co. Ltd. as M-30G, methoxy tetraethylene glycol methacrylate (available from Shin-Nakamura Co. Ltd. as M-40G, methoxy tripropylene glycol methacrylate (available from Shin-Nakamura Co. Ltd. as M-30PG, butoxy diethylene glycol methacrylate (available from Shin-Nakamura Co. Ltd. as B-20G), phenoxy ethylene glycol methacrylate (available from Shin-Nakamura Co. Ltd. as PHE-1G), phenoxy diethylene glycol methacrylate (available from Shin-Nakamura Co. Ltd. as PHE-2G), dicyclopentenyloxyethyl methacrylate (available from Hitachi Chemical, Tokyo, Japan, as FANCRYL FA-512M), dicyclopentanyl methacrylate (available from Hitachi Chemical as FANCRYL FA-513M), isobornyl cyclohexyl methacrylate (available from Designer Molecules, Inc., San Diego, California, as product MM-304), 4-methacryloxyethyl trimellitic anhydride (available from Designer Molecules, Inc. as product A-304, 2-methacryloxyethyl phenyl urethane (available from Polysciences, Inc., Warrington, Pennsylvania), trifluoroethyl methacrylate (available from Hampford Research Inc., Stratford, Connecticut), methacrylamide (available from Evonik Performance Materials GmbH as VISIOMER MAAmide), 2-dimethylaminoethyl methacrylate (available from Evonik Performance Materials GmbH as VISIOMER MADAME), 3-dimethylaminopropyl methacrylamide (available from Evonik Performance Materials GmbH as VISIOMER DMAPMA), and combinations thereof.

In some preferred embodiments, the at least one monofunctional free-radically polymerizable monomer is selected from the group consisting of methyl methacrylate, 2-hydroxyethyl methacrylate, methacrylic acid, 2-(2-butoxyethoxy)ethyl methacrylate, glycerol formal methacrylate, lauryl methacrylate, cyclohexyl methacrylate, phenyl methacrylate, and combinations thereof.

In embodiments of the present disclosure, the monofunctional monomer often comprises 49 to 97 percent by weight of the curable composition; however, this is not a requirement.

Curable compositions according to the present disclosure also include at least one free-radical initiator (i.e., an initiator of free-radical polymerization).

In some embodiments, the free-radical initiator is a redox initiator system, as one-electron transfer redox reactions may be an effective method of generating free radicals under mild conditions. Redox initiator systems have been described, for example, in Progress in Polymer Science (1999), 24, pp. 1149-1204.

In some embodiments, the redox initiator system is a blend of a peroxide with an amine, where the polymerization is initiated by the decomposition of the organic peroxide activated by the redox reaction with amine reducing agent. Typically, the peroxide is benzoyl peroxide, and the amine is a tertiary amine. Aromatic tertiary amines are the most effective compounds to generate the primary radicals, with N,N-dimethyl-4-toluidine ("DMT") being the most common amine reducing agent.

In some embodiments, the redox cure initiator system comprises a barbituric acid derivative and a metal salt. In some embodiments, the barbituric acid/metal salt cure initiator system may further comprise an organic peroxide, an ammonium chloride salt (e.g., benzyltributylammonium chloride), or a mixture thereof.

Examples of free-radical initiators based on barbituric acid include redox initiator systems having (i) a barbituric acid derivative and/or a malonyl sulfamide, and (ii) an organic peroxide, selected from the group consisting of the mono- or multifunctional carboxylic acid peroxide esters. There can be used as barbituric acid derivatives, for example, 1,3,5-trimethylbarbituric acid, 1,3,5-triethylbarbituric acid, 1,3-dimethyl-5-ethylbarbituric acid, 1,5-dimethylbarbituric acid, 1-methyl-5-ethylbarbituric acid, 1-methyl-5-propylbarbituric acid, 5-ethylbarbituric acid, 5-propylbathituric acid, 5-butylbarbituric acid, 1-benzyl-5-phenylbarbituric acid, 1-cyclohexyl-5-ethylbarbituric acid and the thiobarbituric acids mentioned in published German patent application DE 42 19 700 A1 (Imai et al.).

The barbituric acids and barbituric acid derivatives described in U.S. Pat. No. 3,347,954 (Bredereck et al.) and U.S. Pat. No. 9,957,408 (Thompson), as well as the malonyl sulfamides disclosed in the European Pat. No. EP 059 451 B1 (Schmitt et al.), may be useful in embodiments of the present disclosure. Preferred malonyl sulfamides are 2,6-dimethyl-4-isobutylmalonyl sulfamide, 2,6-diisobutyl-4-propylmalonyl sulfamide, 2,6-dibutyl-4-propylmalonyl sulfamide, 2,6-dimethyl-4-ethylmalonyl sulfamide or 2,6-dioctyl-4-isobutylmalonyl sulfamide.

Barbituric acid-based free-radical initiators typically contain mono- or multifunctional carboxylic acid peroxyesters as organic peroxides. Carbonic peroxyesters are also included among the multifunctional carboxylic acid peroxyesters within the meaning of the present disclosure. Suitable examples include carbonic-diisopropyl-peroxydiester, neodecanoic acid-tertiary-butyl-peroxyester, neodecanoic acid-tertiary-amyl-peroxyester, maleic acid-tertiary-butyl-monoperoxyester, benzoic acid-tertiary-butyl-peroxyester, 2-ethylhexanoic acid-tertiary-butyl-peroxyester, 2-ethylhexanoic acid-tertiary-amyl-peroxyester, carbonic-monoisopropylester-monotertiary-butyl-peroxyester, carbonic-dicyclohexyl-peroxyester, carbonic dimyristyl-peroxyester, carbonic dicetyl peroxyester, carbonic-di(2-ethylhexyl)-peroxyester, carbonic-tertiary-butyl-peroxy-(2-ethylhexyl)ester or 3,5,5-trimethylhexanoic acid-tertiary-butyl-peroxyester, benzoic acid-tertiary-amyl-peroxyester, acetic acid-tertiary-butyl-peroxyester, carbonic-di(4-tertiary-butyl-cyclohexyl)-peroxyester, neodecanoic acid-cumene-peroxyester, pivalic acid-tertiary-amyl-peroxyester and pivalic acid tertiary-butyl-peroxyester.

In particular, carbonic-tertiary-butyl-peroxy-(2-ethylhexyl) ester (commercially available from Arkema, Inc. (King of Prussia, Pennsylvania) as LUPEROX TBEC) or 3,5,5-trimethyl-hexanoic acid-tertiary-butyl-peroxyester (commercially available from Arkema, Inc. as LUPEROX 270) can be used as organic peroxides according to embodiments of the present disclosure.

Metal salts that may be used with the barbituric acid derivative can include transition metal complexes, especially salts of cobalt, manganese, copper, and iron. When the metal salt is a copper compound, the salt may possess the general formula $CuX_n$, where X is an organic and/or inorganic anion and n=1 or 2. Examples of suitable copper salts include copper chloride, copper acetate, copper acetylacetonate, copper naphthenate, copper salicylate or complexes of copper with thiourea or ethylenediaminetetraacetic acid, and mixtures thereof. In some embodiments copper naphthenate is particularly preferred.

Another redox initiator system suitable for use in embodiments of the present disclosure comprises an inorganic peroxide, an amine-based reducing agent, and an accelerator, where the amine may be an aromatic and/or aliphatic amine, and the polymerization accelerator is at least one selected from the group consisting of sodium benzenesulfinate, sodium p-toluenesulfinate, sodium 2,4,6-trisopropyl benzenesulfinate, sodium sulfite, potassium sulfite, calcium sulfite, ammonium sulfite, sodium bisulfate, and potassium bisulfate. An example of an inorganic peroxide useful in this system is peroxodisulfate as described in U.S. Pat. No. 8,545,225 (Takei, et al.).

In some embodiments, the curable composition includes a free-radical initiator comprising a metal salt (e.g., copper naphthenate) and an ammonium salt (e.g., benzyltributylammonium chloride). In some embodiments, curable composition includes a cure initiator system comprising a barbituric acid derivative and a metal salt and optionally comprising at least one of an organic peroxide and an ammonium chloride salt.

The curable composition may include, alone or in combination with other free-radical initiator(s), at least one photoinitiator that is activated by light, generally using a ultraviolet (UV) lamp, although other light sources such as LED lamps, Xe flashlamps, and lasers can also be used with the appropriate choice of photoinitiator.

Useful photoinitiators include those known as useful for photocuring free-radically polyfunctional (meth)acrylates. Exemplary photoinitiators include benzoin and its derivatives such as alpha-methylbenzoin; alpha-phenylbenzoin; alpha-allylbenzoin; alpha benzylbenzoin; benzoin ethers such as benzil dimethyl ketal (e.g., available as OMNIRAD BDK from IGM Resins USA Inc., St. Charles, Illinois), benzoin methyl ether, benzoin ethyl ether, benzoin n-butyl ether; acetophenone and its derivatives such as 2-hydroxy-2-methyl-1-phenyl-1-propanone (e.g., available as OMNIRAD 1173 from IGM Resins USA Inc. and 1-hydroxycyclohexyl phenyl ketone (e.g., available as OMNIRAD 184 from IGM Resins USA Inc.); 2-methyl-1-[4-(methylthio) phenyl]-2-(4-morpholinyl)-1-propanone (e.g., available as OMNIRAD 907 from IGM Resins USA Inc.); 2-benzyl-2-(dimethylamino)-1-[4-(4-morpholinyl)phenyl]-1-butanone (e.g., available as OMNIRAD 369 from IGM Resins USA Inc.), and triaryl phosphines and phosphine oxide derivatives such as ethyl-2,4,6-trimethylbenzoylphenyl phosphinate (e.g., available as TPO-L from IGM Resins USA Inc.), and bis-(2,4,6-trimethylbenzoyl)phenylphosphine oxide (e.g., available under the trade designation OMNIRAD 819 from IGM Resins USA Inc.)

Other useful photoinitiators include, for example, pivaloin ethyl ether, anisoin ethyl ether, anthraquinones (e.g., anthraquinone, 2-ethylanthraquinone, 1-chloroanthraquinone, 1,4-dimethylanthraquinone, 1-methoxyanthraquinone, or benzanthraquinone), halomethyltriazines, benzophenone and its derivatives, iodonium salts and sulfonium salts, titanium complexes such as bis(eta5-2,4-cyclopentadien-1-yl)-bis12,6-difluoro-3-(1H-pyrrol-1-yl) phenylhitanium (e.g., available under the trade designation CGI 784DC from BASF, Florham Park, New Jersey); halomethylnitrobenzenes (e.g., 4-bromomethylnitrobenzene), and combinations of photoinitiators where one component is a mono- or bis-acylphosphine oxide (e.g., available under the trade designations IRGACURE 1700, IRGACURE 1800, and IRGACURE 1850 from BASF, Florham Park, New Jersey, and as OMNIRAD 4265 from IGM Resins USA Inc.).

The free-radical initiator can also be a thermally activated free-radical initiator such as an azo initiator (e.g., azobisisobutyronitrile) or a peroxide (e.g., benzoyl peroxide).

The free-radical initiator is present in the curable composition in amounts sufficient to permit an adequate free-radical reaction rate of curing of the curable composition upon initiation of polymerization, amounts which may be readily determined by one of ordinary skill in the relevant arts. In embodiments of the present disclosure, the free-radical initiator is typically present in the curable composition at a level of 0.1 to 10 percent by weight, more typically 0.5 to 5 percent by weight of the cure free-radically polymerizable components in the curable composition; however, this is not a requirement.

In certain embodiments, wherein the curable composition comprises 49 to 97 percent by weight of the at least one monofunctional free-radically polymerizable monomer, 0.1 to 10 percent by weight of the at least one free-radical initiator, and 2.9 to 50.9 percent by weight of the at least one free-radically polymerizable crosslinker based on the total weight of the curable composition.

The curable composition may further comprise other compounds having two or more free-radically polymerizable groups (e.g., hexanediol diacrylate or trimethylolpropane triacrylate); however, this is typically not preferred.

The curable compositions may optionally further comprise one or more conventional additives. Additives may include, for example, tackifiers, plasticizers, dyes, pigments, antioxidants, UV stabilizers, corrosion inhibitors, dispersing agents, wetting agents, adhesion promotors, and fillers.

Fillers useful in embodiments of the present disclosure include, for example, fillers selected from the group consisting of a micro-fibrillated polyethylene, a fumed silica, a talc, a wollastonite, an aluminosilicate clay (e.g., halloysite), phlogopite mica, calcium carbonate, kaolin clay, metal oxides (e.g., barium oxide, calcium oxide, magnesium oxide, zirconium oxide, titanium oxide, zinc oxide), nanoparticle fillers (e.g., nanosilica, nanozirconia), and combinations thereof.

The curable composition may be provided as a one-part or two-part composition; for example depending on the free-radical initiator chosen.

Curable compositions according to the present disclosure may be at least partially cured by exposure to actinic electromagnetic radiation (e.g., ultraviolet and/or visible light), thermal energy (e.g., in an oven, infrared radiation, or thermal conduction), by exposure to oxygen, by combining two-parts of a two part composition, or any combination of the foregoing.

After at least partial curing, a crosslinked composition is generally obtained, and if sufficiently cured it may be suitable for use as a structural adhesive to bond two adherends. In such use, the curable composition is typically sandwiched between the adherends and at least partially cured; for example, sufficient to achieve at least a desired level of bond strength.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless otherwise indicated, all other reagents were obtained, or are available from fine chemical vendors such as Sigma-Aldrich Company, St. Louis, Missouri, or may be synthesized by known methods. Table 1 (below) lists materials used in the examples and their sources.

TABLE 1

| DESIGNATION | DESCRIPTION | SOURCE |
|---|---|---|
| HC1101 | Branched poly(tetrahydrofuran) diamine with primary (1°) amine content of 7143 g/eq and total amine content of 5243 g/eq obtained under the trade designation DYNAMAR HC-1101 | 3M Company, Maplewood, Minnesota |
| VEEA | 2-(2-Vinyloxyethoxy)ethyl acrylate | Nippon Shokubai Co., Ltd., Osaka, Japan |
| $BzBu_3N^+Cl^-$ | Benzyltributylammonium chloride | Sachem Americas, Austin, Texas |
| XT100 | Methyl methacrylate-butadiene-styrene (MBS) core-shell toughening agent obtained under the trade designation CLEARSTRENGTH XT100 | Arkema Inc., King of Prussia, Pennsylvania |
| MMA | Methyl methacrylate obtained under the trade designation VISIOMER MMA | Evonik Performance Materials GmbH, Essen, Germany |
| MA | Methacrylic acid | Alfa Aesar, Ward Hill, Massachusetts |
| NK ESTER SA | β-Methacryloyl oxyethyl hydrogen succinate obtained under the trade designation NK ESTER SA | Shin-Nakamura Chemical Co. Ltd., Wakayama, Japan |
| SR340 | 2-Phenoxyethyl methacrylate obtained under the trade designation SR340 | Sartomer, Exton, Pennsylvania |
| HEMA | 2-hydroxyethyl methacrylate obtained under the trade designation VISIOMER HEMA 97 | Evonik Performance Materials GmbH |
| CuNap | Copper naphthenate 8% in mineral spirits | Strem Chemicals, Newburyport, Massachussetts |

Test Methods

Transmission-FTIR Spectroscopy Measurements

Transmission-FTIR measurements were recorded using a Thermo Nicolet iS5 System FTIR (Thermo Fisher Scientific Co., Waltham, Massachusetts) spectrometer. Samples were prepared by diluting an aliquot of a reaction in toluene to provide a solution, spreading the solution onto a salt plate, and drying under a nitrogen stream.

Overlap Shear Test

Each sample formulation was separately loaded into the 10-part side of a 10:1 dual syringe cartridge dispenser, using the accelerator from 3M SCOTCH-WELD DP841ONS Acrylic Adhesive (3M Company) in the 1-part side of the dispenser in each case. All bonds were prepared by dispensing the sample formulation and accelerator through a static mixing tip. The resulting adhesives were used to prepare overlap shear test samples on grit-blasted aluminum substrates. Overlap shear samples were 2.54 cm (centimeter)×10.16 cm×16 cm aluminum coupons using 0.076-0.0127 millimeter (mm) spacer beads with a 1.27 cm overlap. The bond line was clamped with binder clips during cure and the clips were removed after 24 hours at 25° C. Testing was run on a 5000 pound (22 kiloNewton (kN)) load cell for overlap shear. The values are an average of three specimens.

Impact Test

Each sample formulation was separately loaded into the 10-part side of a 10:1 dual syringe cartridge dispenser, using the accelerator from SCOTCH-WELD DP84 IONS Acrylic Adhesive (3M Company, St. Paul, MN) in the 1-part side of the dispenser in each case. All bonds were prepared by dispensing the sample formulations and accelerator through a static mixing tip to adhesive compositions used to prepare impact test samples on grit-blasted aluminum substrates. Impact samples were 2.54 cm×cm×16 cm aluminum coupons using 0.076-0.0127 mm spacer beads with a 1.27 cm overlap. The bond line was clamped with binder clips during cure and the clips were removed after 24 hours at 25 ° C. The samples were tested on an Instron CP9050 Impact Pendulum (Norwood, MA) with the samples held in a clamp and impacted on the edge of the bonded area. The test parameters were according to ISO 179-1, using a 21.6 J hammer dropped from a 150.0° angle.

Tensile Testing of Cured Films

Films of cured compositions were prepared by combining in a polypropylene Max100 DAC cup (part number 501 221 from FlackTek, Inc., Landrum, South Carolina) 40 grams (g) of a sample formulation and 4 g accelerator from SCOTCH-WELD DP8410NS Acrylic Adhesive (3M Company). The cup was closed with a polypropylene lid and the mixture was high-shear mixed at ambient temperature and pressure using a FlackTek, Inc. SPEEDMIXER (DAC 400.2 VAC) for 25 seconds at 1500 rpm (revolutions per minute). The resulting mixtures were coated between silicone-treated polyester release liners at approximately 1 mm thickness. The coated films were allowed to sit at room temperature a minimum of 24 hours before testing. Tensile elongation measurements were performed according to ASTM Standard D638-14 "Standard Test Method for Tensile Properties of Plastics", 2015 using a TYPE-V die for specimen cutting, and a 100 mm/minute crosshead test speed.

Dynamic Mechanical Analysis ("DMA") Test

Film samples were prepared using the films prepared for the Tensile Testing as described above. Film samples were cut to approximately 6-7 mm width x 1 mm thick x 50 mm length and tested on a DMAQ800 (TA Instruments Inc., New Castle, Delaware) using a dual cantilever fixture with the following settings: frequency=1 Hz, oscillation amplitude=15 micrometer (um), and minimum oscillation force=0.02 Newton (N). The film samples were equilibrated to −75° C. and held at that temperature for five minutes, followed by a temperature ramp of 3.0 ° C./minute to 150° C.

Synthesis of Vinyloxy-Terminated HC1101 (HC1101-VEEA)

To a Max 200 DAC cup (FlackTek, Inc.) was added HC1101 polymer (branched diamine poly(tetrahydrofuran) with primary (1°) amine content of 7143 g/equivalent and total amine content of 5243 g/equivalent) (150 g). The cup was heated at 70° C. for 3 hours to melt the material, after which 2-(2-vinyloxyethoxy)ethyl acrylate (VEEA) (5.59 g) was added. The mixture was hand stirred using a wooden tongue depressor, and mixed using a DAC 400 high shear mixer at 2000 rpm for 1 minute. The mixture was monitored by transmission FTIR using 15 mil silicone rubber spacer. There was a small peak observed at 6165 $cm^{-1}$ due to the acrylate, so the sample was placed back into the 70° C. oven for four hours at which time the transmission FTIR showed essentially no remaining acrylate peak.

Example 1 (EX-1)

A curable adhesive was prepared by combining the components of Table 2 in a polypropylene MAX 200 DAC cup (part number 501 220 from FlackTek, Inc.,). After capping with a polypropylene lid, the mixture was mixed, three times, in a high shear SPEEDMIXER (DAC 400.2 VAC from FlackTek, Inc.) for one minute at 1500 revolutions per minute with hand stirring using a wood tongue depressor between mixes. The samples were degassed by capping with a polypropylene lid that contained a vent hole, and high-shear mixed at 2000 revolutions per minute under reduced pressure (35 Torr). The curable adhesive was stored refrigerated (approximately 6° C.) until used.

TABLE 2

| COMPONENT | PARTS, g |
|---|---|
| XT100 | 9.4 |
| MMA | 10.9 |
| HEMA | 5.2 |
| SR340 | 17.8 |
| HC1101-VEEA Crosslinker | 37.7 |
| MA | 13.4 |
| NK Ester SA | 3.4 |
| $BzBu_3N^+Cl^-$ | 2.1 |
| CuNap | 0.1 |

Bonds incorporating the Curable Adhesive of Table 2 were prepared between grit-blasted aluminum coupons using the procedure described above. Testing procedures for Overlap Shear and Impact are described above with the testing results reported in Tables 3 and 4, below.

TABLE 3

| EXAMPLE | CROSSLINKER | OVERLAP SHEAR, psi (MPa) |
|---|---|---|
| EX-1 | HC1101-VEEA | 2178 (15.02) |
| Comparative Example 1 | LORD 406/19 | 2610 (18.00) |
| Comparative Example 2 | LORD 810/20G | 1176 (8108) |
| Comparative Example 3 | Plexus MA530 | 2481 (17.11) |
| Comparative Example 4 | 3M 8410 | 3318 (22.88) |

TABLE 4

| EXAMPLE | CROSS-LINKER | IMPACT ENERGY, Joules Specimen 1 | Specimen 2 | Specimen 3 | Average |
|---|---|---|---|---|---|
| EX-1 | HC1101-VEEA | 14.9 | 19.4 | 19.6 | 18.0xxx |
| Comparative Example 1 | LORD 406 | 2.6 | 1.7 | 2.3 | 2.2 |
| Comparative Example 2 | LORD 810 | 2.5 | 3.0 | 3.1 | 2.9 |
| Comparative Example 3 | Plexus MA530 | 1.8 | 1.9 | 2.0 | 1.9 |
| Comparative Example 4 | 3M 8410 | 6.8 | 5.7 | 4.4 | 5.6 |

Sample Films and Bond Testing

A film coating incorporating the curable adhesive was prepared using the procedure described above. Testing procedures for Tensile Elongation Measurements and Dynamic Mechanical Analysis ("DMA") using the prepared film coatings were performed as described above. Sample film testing results are reported in Tables 5 and 6, below.

TABLE 5

| EXAMPLE | METHACRYLATE CROSSLINKER | PEAK STRESS, psi (MPa) | STRAIN AT BREAK, % | MODULUS, psi (MPa) |
|---|---|---|---|---|
| EX-1 | HC1101-VEEA | 3376 (23.28) | 952 | 14016 (96.637) |
| Comparative Example 1 | LORD 406/19 | 3259 (22.47) | 6 | 107041 (738.022) |
| Comparative Example 2 | LORD 810/20G | 2022 (13.94) | 19 | 21653 (149.29) |
| Comparative Example 3 | PLEXUS MA530 | 3660 (25.23) | 16 | 32437 (223.65) |
| Comparative Example 4 | 3M 8410 | 3923 (27.05) | 19 | 36290 (250.21) |

TABLE 6

| EXAMPLE | METHACRYLATE CROSSLINKER | DMA (tan δ), ° C. | WIDTH AT HALF HEIGHT, ° C. |
|---|---|---|---|
| EX-1 | HC1101-VEEA | 92.18 | 71.90 |
| Comparative Example 1 | LORD 406 | 68.36 | 44.55 |
| Comparative Example 2 | LORD 810 | 46.34 | 32.64 |
| Comparative Example 3 | Plexus MA530 | 88.35 | 25.72 |
| Comparative Example 4 | 3M 8410 | 93.84 | 34.88 |

Cited references, patents, and patent applications in this application that are incorporated by reference, are incorporated in a consistent manner. In the event of inconsistencies or contradictions between portions of the incorporated references and this application, the information in this application shall control. The preceding description, given in order to enable one of ordinary skill in the art to practice the claimed disclosure, is not to be construed as limiting the scope of the disclosure, which is defined by the claims and all equivalents thereto.

What is claimed is:

1. A free-radically polymerizable crosslinker comprising divalent segments Z represented by the formula $$-\!\!\left[\!(R^1-O)_n-R^1\right]\!\!-$$

wherein each divalent segment Z is respectively directly bonded to:

i) two secondary N atoms, each further directly bonded to a divalent segment Z or an X group;

ii) two tertiary N atoms, each further directly bonded to p additional divalent segments Z and (2-p) X groups, wherein p is 0, 1, or 2; or iii) a secondary N atom further directly bonded to: one additional divalent segment Z or an X group, and a tertiary N atom further directly bonded to p additional divalent segments Z and (2-p) X groups, wherein each $R^1$ independently represents an alkylene group having from 1 to 4 carbon atoms, wherein each n independently represents a positive integer, and wherein each X group is represented by the formula:

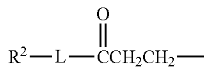

wherein L is $-CH_2CH_2OCH_2CH_2O-$, and wherein each $R^2$ is independently a free-radically polymerizable group selected from vinyloxy, allyloxy, methacryloxy, vinylaryl having from 8 to 12 carbon atoms, and 2-propenylaryl having from 9 to 13 carbon atoms, with the proviso that no two of O, S, or N atoms in the X group are adjacent.

2. The free-radically polymerizable crosslinker of claim 1, wherein $R^2$ is methacryloxy, allyloxy, or vinyloxy.

3. The free-radically polymerizable crosslinker of claim 1, wherein the free-radically polymerizable crosslinker has a number average molecular weight of from 4000 to 54000 grams per mole as measured by gel permeation chromatography at 40° C. versus a polystyrene standard.

4. The free-radically polymerizable crosslinker of claim 1, wherein the free-radically polymerizable crosslinker has two X groups.

5. The free-radically polymerizable crosslinker of claim 1, wherein the free-radically polymerizable crosslinker has at least two X groups.

6. The free-radically polymerizable crosslinker of claim 1, wherein the free-radically polymerizable crosslinker has at least three X groups.

7. The free-radically polymerizable crosslinker of claim 1, wherein $R^1$ is $-CH_2CH_2CH_2CH_2-$.

8. A curable composition comprising:

at least one monofunctional free-radically polymerizable monomer;

at least one free-radical initiator; and at least one free-radically polymerizable crosslinker according to claim 1.

9. The curable composition of claim 8, wherein the at least one monofunctional free-radically polymerizable monomer is selected from the group consisting of methyl methacrylate, 2-hydroxyethyl methacrylate, benzyl methacrylate, methacrylic acid, 2-(2-butoxyethoxy)ethyl methacrylate, glycerol formal methacrylate, lauryl methacrylate, cyclohexyl methacrylate, phenyl methacrylate, and combinations thereof.

10. The curable composition of claim 8, wherein the curable composition comprises 49 to 97 percent by weight of the at least one monofunctional free-radically polymerizable monomer, 0.1 to 10 percent by weight of the at least one free-radical initiator, and 2.9 to 50.9 percent by weight of the at least one free-radically polymerizable crosslinker based on the total weight of the curable composition.

11. The curable composition of claim 8, wherein the curable composition further comprises a filler.

12. The curable composition of claim 11, wherein the filler is selected from the group consisting of microfibrillated polyethylene, fumed silica, talc, wollastonite, aluminosilicate clay, phlogopite mica, calcium carbonate, kaolin clay, and combinations thereof.

13. A partially cured reaction product of the curable composition of claim 8.

14. A cured reaction product of the curable composition of claim 8.

15. A free-radically polymerizable crosslinker comprising divalent segments Z represented by the formula $$-\!\!\left[\!(R^1-O)_n-R^1\right]\!\!-$$

wherein each divalent segment Z is respectively directly bonded to:

i) two secondary N atoms, each further directly bonded to a divalent segment Z or an X group;

ii) two tertiary N atoms, each further directly bonded to p additional divalent segments Z and (2-p) X groups, wherein p is 0, 1, or 2; or iii) a secondary N atom further directly bonded to: one additional divalent segment Z or an X group, and a tertiary N atom further directly bonded to p additional divalent segments Z and (2-p) X groups, wherein each $R^1$ independently represents an alkylene group having from 1 to 4 carbon atoms, wherein each n independently represents a positive integer, and wherein each X group is represented by the formula:

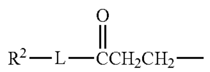

wherein each L independently represents a covalent bond, O, S, $N^1$, or a divalent linking group having from 2 to 8 carbon atoms and up to 3 oxygen atoms and wherein each $R^2$ is independently a free-radically polymerizable group selected from vinyloxy, allyloxy, methacryloxy, vinylaryl having from 8 to 12 carbon atoms, and 2-propenylaryl having from 9 to 13 carbon atoms, with the proviso that no two of O, S, or N atoms in the X group are adjacent, wherein the free-radically polymerizable crosslinker has a number average molecular weight of from 4000 to 54000 grams per mole as measured by gel permeation chromatography at 40° C. versus a polystyrene standard.

16. The free-radically polymerizable crosslinker of claim 15, wherein the free-radically polymerizable crosslinker has two X groups.

17. The free-radically polymerizable crosslinker of claim 15, wherein the free-radically polymerizable crosslinker has at least two X groups.

18. The free-radically polymerizable crosslinker of claim 15, wherein the free-radically polymerizable crosslinker has at least three X groups.

19. The free-radically polymerizable crosslinker of claim 15, wherein $R^1$ is —$CH_2CH_2CH_2CH_2$—.

* * * * *